C. C. REDMOND.
COVERS FOR LIQUID MEASURES.

No. 194,784. Patented Sept. 4, 1877.

Attest.
James H. Birch Jr.
F. H. Nicholson

Inventor.
Charles C. Redmond

UNITED STATES PATENT OFFICE.

CHARLES C. REDMOND, OF SANTA CLARA COUNTY, ASSIGNOR OF ONE-HALF HIS RIGHT TO JAMES HART AND FRANCIS H. NICHOLSON, OF SAN JOSÉ, CALIFORNIA.

IMPROVEMENT IN COVERS FOR LIQUID-MEASURES.

Specification forming part of Letters Patent No. 194,784, dated September 4, 1877; application filed May 2, 1877.

*To all whom it may concern:*

Be it known that I, CHARLES C. REDMOND, of the county of Santa Clara, State of California, have invented a new and useful instrument or machine for the purpose of measuring and transferring liquids or small grains, seeds, &c., called a "Combined Measure and Tunnel;" and I do hereby declare that the following is a full, clear, and exact description of the construction and operation of the same, reference being had to the annexed drawings, making a part of this specification, in which—

Figure 1:
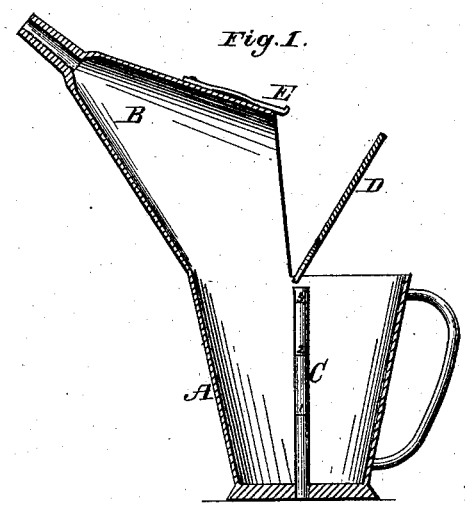
Figure 2:
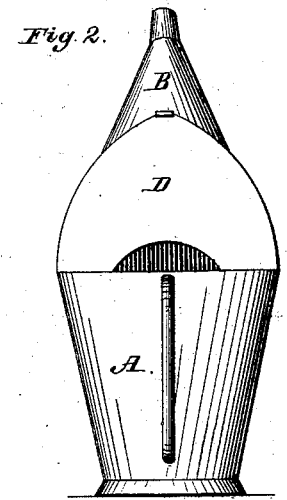
Figure 3:
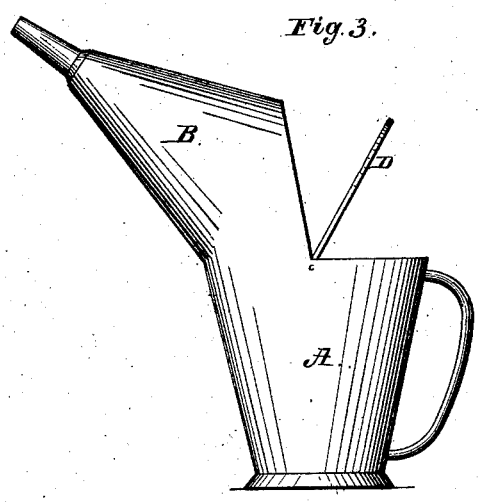

Figure 1 represents a transverse section. Fig. 2 represents a longitudinal elevation, and Fig. 3 a perspective view.

This invention relates to improvements in combined measure and tunnel, whereby it can be adapted as a measure or a tunnel, as desired; and the invention consists in the construction and arrangement of parts, as will be hereinafter fully described.

A, in the drawing, represents a vessel provided with a tunnel, B, as clearly shown in Fig. 1. C is a center-rod secured to the bottom of the vessel, and is provided with marks or figures thereon, to determine the quantity or amount of its contents. The vessel is provided with a lid or cover, D, for the tunnel, when transferring liquid from the vessel or measure. E is a catch for securing the lid or cover, when desired.

By lowering the lid or cover of the tunnel it can be used the same as any other tunnel for the purpose of transferring liquids or grain, seeds, &c., without using the vessel or measure.

I claim as my invention—

The combination, with the vessel A and tunnel B, of the lid or cover D, substantially as and for the purpose specified.

CHARLES C. REDMOND.

Witnesses:
JAMES H. BIRCH, Jr.,
F. H. NICHOLSON.